(12) United States Patent
Meagher et al.

(10) Patent No.: US 8,142,841 B2
(45) Date of Patent: Mar. 27, 2012

(54) APPARATUS AND METHODS FOR DEOXIDIZING METAL SURFACES

(75) Inventors: Kevin K. Meagher, Duesseldorf (DE); Timm L. Kelly, Birmingham, MI (US)

(73) Assignee: Henkel KGaA, Duesseldorf (DE)

( * ) Notice: Subject to any disclaimer, the term of this patent is extended or adjusted under 35 U.S.C. 154(b) by 1097 days.

(21) Appl. No.: 11/454,667

(22) Filed: Jun. 16, 2006

(65) Prior Publication Data
US 2007/0148355 A1 Jun. 28, 2007

Related U.S. Application Data

(63) Continuation of application No. PCT/US03/040200, filed on Dec. 18, 2003.

(51) Int. Cl.
*B05D 5/12* (2006.01)
*B05D 1/36* (2006.01)
(52) U.S. Cl. ........... 427/115; 427/299; 427/327; 427/58
(58) Field of Classification Search .................... 427/327
See application file for complete search history.

(56) References Cited

U.S. PATENT DOCUMENTS

| | | | |
|---|---|---|---|
| 3,632,447 A | 1/1972 | Albrecht et al. | |
| 4,126,483 A | 11/1978 | Donakowski et al. | |
| 5,108,544 A | 4/1992 | Hakansson | |
| 5,273,634 A * | 12/1993 | Fukui et al. | 204/192.34 |
| 5,567,482 A * | 10/1996 | Ilgar et al. | 427/510 |
| 5,624,769 A | 4/1997 | Li et al. | |
| 6,375,726 B1 * | 4/2002 | Matzdorf et al. | 106/14.44 |
| 6,521,029 B1 * | 2/2003 | Matzdorf et al. | 106/14.44 |
| 2002/0096229 A1 * | 7/2002 | Meagher et al. | 148/243 |
| 2002/0155333 A1 | 10/2002 | Fitts et al. | |
| 2005/0037935 A1 * | 2/2005 | Abd Elhamid et al. | 510/175 |

FOREIGN PATENT DOCUMENTS

| | | |
|---|---|---|
| DE | 102004038632 A1 | 6/2005 |
| JP | 4032583 A | 2/1992 |
| JP | 11345618 A | 12/1999 |
| WO | 0070123 A1 | 11/2000 |
| WO | 2005019498 A2 | 3/2005 |

OTHER PUBLICATIONS

Turco Liquid Smut-Go NC MSDS.*
Turco 4215 NC-LT MSDS.*

(Continued)

*Primary Examiner* — David Turocy
(74) *Attorney, Agent, or Firm* — Mary K. Cameron

(57) ABSTRACT

Methods for deoxidizing metallic surfaces are disclosed. Such a method may include contacting a surface of a metal strip with one or more chemical solutions until a potential drop across a thickness of the metal strip is less than a preselected value. To process a metal strip such that it may be suitable for fabrication of a bipolar plate for use in a fuel cell, the metal strip may be processed until the potential drop is less then about 15 mV. A surface of the metal strip may be contacted for a first period of time with a first chemical solution having a pH of between 10 and 14. Thereafter, the surface may be contacted for a second period of time with a second chemical solution having a pH of between 1 and 3. A conductive organic coating may then be applied to the surface. Such methods are particularly suitable for use in connection with a coil coating process.

43 Claims, 1 Drawing Sheet

OTHER PUBLICATIONS

He et al. A Scanning Vibrating Electrode Study of Chromated Epoxy Primer on Steel and Aluminum. Journal or the Electrochemical Society, 147 (10) 3661-3666, 2000.*

Supplementary European Search Report dated Aug. 27, 2008, European Application No. 03 81 9278.

Hwang E R., et al, "A study of a corrosion-resistant coating for a separator for a molten carbonate fuel cell", Journal of Power Sources, Elsevier, Nov. 1, 1998, vol. 76, No. 1, pp. 48-53, Amsterdam, Netherlands, XP004142869.

Murphy, D.P., "Kirk-Othmer Encyclopedia of Chemical Technology: Metal surface treatments, cleaning", Dec. 4, 2000, John Wiley and Sons, Inc., XP002492315.

Hacias, K., "Kirk-Othmer Encyclopedia of Chemical Technology: Metal Surface treatments, pickling", Dec. 4, 2000, John Wiley and Sons, Inc., XP002492316.

* cited by examiner

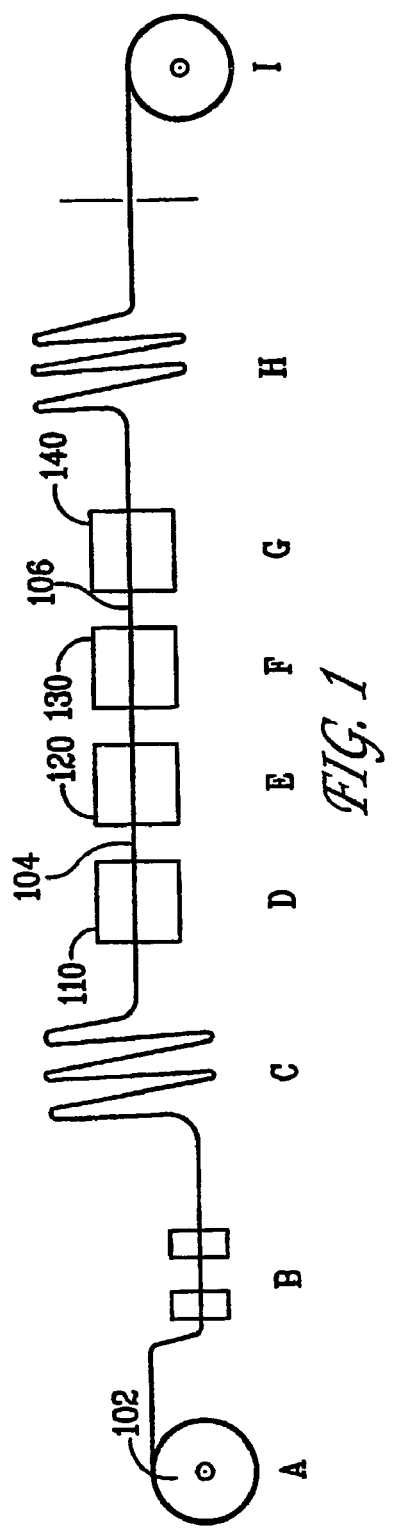
FIG. 1
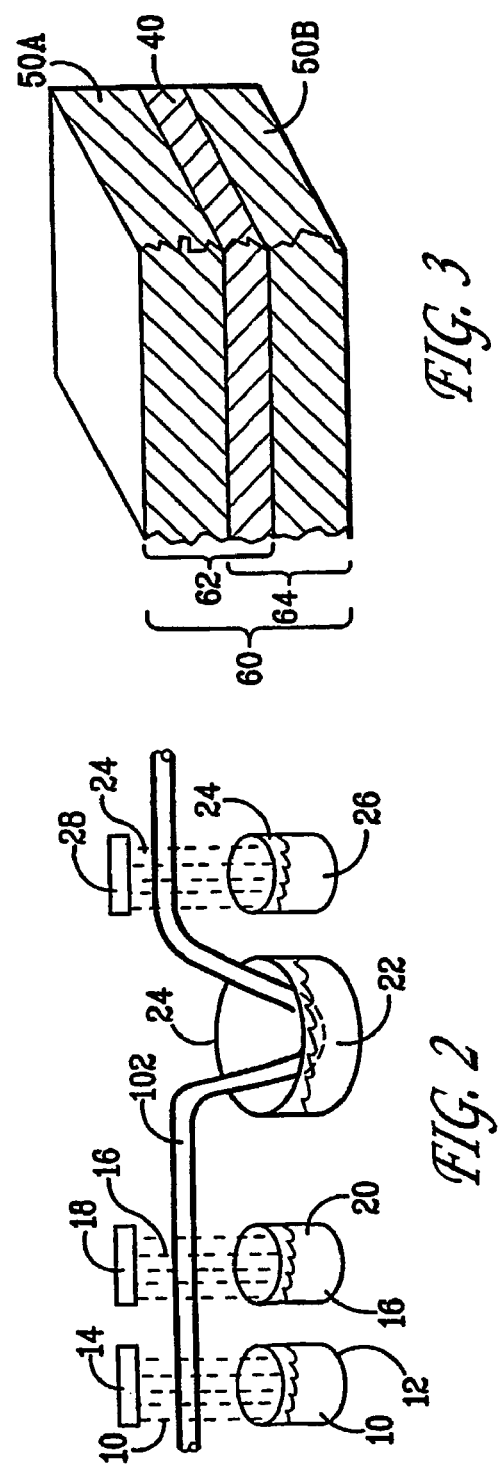
FIG. 3
FIG. 2

APPARATUS AND METHODS FOR DEOXIDIZING METAL SURFACES

CROSS-REFERENCE TO RELATED APPLICATIONS

This application is a continuation under 35 USC Sections 365(c) and 120 of International Application Number PCT/US2003/040200, having an international filing date of Dec. 18, 2003, and published in English on Jul. 28, 2005 as International Publication Number WO2005/068088A1, which is incorporated herein by reference in its entirety.

FIELD OF THE INVENTION

Generally, the invention relates to methods for deoxidizing surfaces of a metal such as stainless steel, aluminum, or titanium. More specifically, the invention relates to methods for deoxidizing such surfaces sufficiently so that the deoxidized metal may be suitable for use in the fabrication of bipolar plates for fuel cell applications.

BACKGROUND OF THE INVENTION

Fuel cells are known sources of electrical energy. As an individual fuel cell typically produces insufficient electrical energy for any practical application, fuel cells are typically combined to form a fuel cell stack. Bipolar plates are typically employed to conduct current from cell to cell, and to provide channels for gas flow into the stack.

In a typical fuel cell stack, a number of bipolar plates are stacked alternatively with diffusion media, in an anode-medium-cathode-medium-anode arrangement, and then placed under pressure to seal the interfaces. Thus, a bipolar plate may serve as an electrode for each of two adjoining fuel cells. The electrical output required from the fuel cell stack determines the number of cells, and therefore, the number of bipolar plates needed.

It should be understood that, the more conductive a bipolar plate is, the fewer cells will be required to produce a given power output. It should also be understood that, the more conductive a bipolar plate is, the less heat energy it will emit. To produce smaller, lower-cost fuel cells, methods for improving conductivity of bipolar plates are therefore desirable.

Contact elements are often fabricated from graphite, which is light-weight, corrosion-resistant, and electrically conductive. The electrical and thermal conductivity of graphite, however, is quite low compared with light weight metals such as stainless steel, aluminum, titanium, and their alloys. Unfortunately, such light weight metals are either not corrosion resistant in the fuel cell environment, and, therefore, contact elements made from such metals deteriorate rapidly, or they form highly electronically resistive oxide films on their surface that increase the internal resistance of the fuel cell and reduce its performance.

U.S. Pat. No. 5,624,769, which issued on Apr. 29, 1997, and reissued on Jul. 17, 2001, as reissue patent Re 37,284 (collectively "the 769 patent"), is assigned to General Motors. The disclosures of U.S. Pat. No. 5,624,769 and Re 37,284 are incorporated herein in their entireties.

The '769 patent, which is entitled "Corrosion resistant PEM fuel cell," discloses a PEM fuel cell having electrical contact elements (including bipolar plates) comprising a titanium nitride coated light weight metal (e.g., Al or Ti) core, having a protective metal layer intermediate the core and the titanium nitride. The protective layer is susceptible to oxidation in the operating environment of the fuel cell so as to form a barrier to further corrosion at sites where the layer is exposed to such environment. Oxides formed on the protective metal layer have relatively low electrical resistivity so as not to substantially increase the internal resistance of the fuel cell.

An oxide layer, however, is native on exposed surfaces of the bipolar plate before any such protective layer is deposited on the plate. Oxide layer thickness is directly related to the potential drop across the interface of stainless steel, aluminum, and titanium (most oxides in fact). Reduction of these potential, and correlated IR, drops tend to improve fuel cell efficiency. Therefore, to improve conductivity, it is desirable to control (i.e., limit, reduce) the thickness of the oxide layer.

Currently, material to be used for the fabrication of bipolar plates (and, therefore, for the fabrication of fuel cells from such bipolar plates) is deoxidized electrochemically. Materials that have been deoxidized by electrochemical activation for use in the fabrication of bipolar plates are known to have ~10 mV potential drop for the electrode couple at 1 A/cm$^2$. Electrochemical activation, however, is known to take a relatively long time. In some cases, as much as 45 minutes is required to achieve the desired potential drop.

SUMMARY OF THE INVENTION

Methods according to the invention for deoxidizing a surface of a metal strip include contacting a surface of the metal strip with one or more chemical solutions until a potential drop across a thickness of the metal strip is less than a preselected value.

The surface of the metal strip may be contacted for a first period of time with a first chemical solution having a pH of about 10-14. Preferably, the first chemical solution comprises a phosphate source and an organic chelant. Thereafter, the surface of the metal strip may be contacted for a second period of time with a second chemical solution having a pH of about 1-3. Preferably, the second chemical solution comprises sulfuric acid, surfactants, and, optionally, a fluoride source. The surface of the metal strip may be immersed in the chemical solutions, or the chemical solutions may be applied to the surface of the metal strip, such as by spraying or rolling, for example. At least a portion of the metal strip may then be coated with a conductive organic coating. The surface of the metal strip may be rinsed with a dilute acidic rinse before the organic coating is applied. The surface may then be rinsed with water.

Preferably, the surface of the metal strip is exposed to the chemical solutions in a coil coating process. The metal strip may be uncoiled and provided to a chemical application unit that causes the first chemical solution to contact the surface of the metal strip. Thereafter, the metal strip may be rinsed, with warm water, for example. The second chemical solution may then be applied to the surface of the metal strip. The strip may then be rinsed again in a dilute acidic rinse, and then a water rinse. A conductive organic coating may then be applied to the surface of the metal strip, and the metal strip re-coiled for shipment.

The surface of the metal strip may be exposed to one or more of the chemical solutions until the potential drop over the thickness of the metal strip is less than 15 mV, for example. Thus, the metal strip may be suitable for use in the manufacture of bipolar plates for fuel cell applications. Bipolar plates fabricated using a metal strip processed according to the inventive methods and fuel cells comprising such bipolar plates are also disclosed and claimed.

BRIEF DESCRIPTION OF THE DRAWINGS

FIG. 1 depicts an example embodiment of a coil coating process that may be used in conjunction with the principles of the invention.

FIG. 2 depicts an example embodiment of a chemical application system that may be used in conjunction with the principles of the invention.

FIG. 3 depicts an example test sample that may be used in testing the methods of the invention.

DETAILED DESCRIPTION OF ILLUSTRATIVE EMBODIMENTS

According to the invention, a process, such as a coil coating process, for example, may be used to deoxidize a metal strip sufficiently so that a potential drop across the deoxidized strip is sufficiently low that the material may be suitable for the fabrication of bipolar plates for use in fuel cell applications. In an example embodiment of a method according to the invention, a coil coating process may be used to apply one or more chemicals to one or more surfaces of a metal strip. Coil coating is a known, automated, continuous process for coating metal before the metal is used for fabrication of an end product. An example of a coil coating process used in accordance with the invention is depicted in FIG. 1.

As shown in FIG. 1, a coiled strip of bare metal 102 may be uncoiled at step A. At this point, the metal strip 102 may be observed for defects. At step B, the end of a first metal strip may be spliced to the beginning of a second metal strip in order to provide a continuous metal strip for subsequent processing. At step C, the metal strip 102 is enabled to accumulate before entry into the remaining steps of the process. Accumulation is desirable to provide slack (and, therefore, time) for the strips to be spliced.

At step D, the metal strip 102 is provided to a chemical application system 110, wherein it may be cleaned and chemically treated in preparation for coating. Such processes as metal degreasing, cleaning, rinsing, and chemical pretreatment, for example, may be performed. Brushes may be used to physically remove contaminants from the strip, or the metal may be abraded by flap sanders to further enhance the surface. Pretreatments may be used to provide the bond between the metal and the coating, in addition to adding any corrosion resistance. The type of chemical pretreatment used may vary with the type of metal being used.

According to the invention, one or more chemical solutions may be applied to the metal strip until a potential drop across a thickness of the metal strip is less than a pre-selected value. Preferably, chemical solutions are applied until the potential drop across the thickness of the metal strip is less than 15 mV at a current density of 1 ampere per square centimeter. As described in detail below, a first chemical solution, having a pH of between 10 and 14, may be applied to one or more surfaces of the metal strip for a first predefined period of time. Subsequently, a second chemical solution, having a pH of between 1 and 3, may be applied to the surfaces for a second predefined period of time. The solutions may be applied by spraying or rolling the solution onto the surface of the strip, or by submersing the surface of the strip in the solution.

At step E, the chemically treated metal strip 104 may continue through a drying oven 120. At step F, the metal strip 104 continues through a coating unit 130, where at least a portion of the surface may be coated with a conductive organic coating. The conductive organic coating may be a protective coating, paint, or adhesive. Such coatings are well-known. At step G, the coated metal strip 106 continues through a curing oven 140 wherein the coating is cured.

At step H, the coated metal strip 106 is enabled to accumulate for recoiling and cutting, which occurs at step I.

FIG. 2 depicts an example embodiment of a chemical application system 110 that may be used in conjunction with the principles of the invention. Within the chemical application system, a first chemical solution 10 is applied to either or both sides of the metal strip 102 for a first predefined period of time. As shown, the first chemical solution 10 is applied by spraying, though it could be applied by rolling or immersing the strip in the solution. A reservoir 12 may be provided to catch the runoff solution, which may then be pumped back to the sprayer 14.

Preferably, the first chemical solution 10 is an alkaline solution, having a pH of between 10 and 14, and including a phosphate source and an organic chelant. An example of such a solution is a 5% solution of PARCO Cleaner (PC) 1200, which is an alkaline phosphated cleaner manufactured and sold by Henkel Corporation. The metal strip 102 may then be rinsed using a first rinsing agent 16, such as warm water, which may be applied by a sprayer 18, as shown. A reservoir 20 may be may be provided to catch the runoff rinsing agent, which may then be pumped back to the sprayer 18. As shown, the first rinsing agent 16 is applied by spraying, though it could be applied by rolling or immersing the strip in the rinsing agent.

If desired, a second chemical solution 22 may then be applied to either or both sides of the metal strip 102 for a second predefined period of time. As shown, the second chemical solution 22 is applied by immersing the strip in the solution, which is contained in a bath 24. Alternatively, the second chemical solution 22 may be applied by rolling or spraying the solution 22 onto the surface of the strip 102.

Preferably, the second chemical solution 22 is an acidic solution, having a pH of between 1 and 3. An example of such a solution is a 3% solution of RIDOLENE 123, which includes a combination of sulfuric acid and surfactants, and is manufactured and sold by Henkel Corporation. Optionally, but preferably, the second chemical solution 22 may include fluoride (e.g., in the form of HF).

The metal strip 102 may then be rinsed using a second rinsing agent 24, which is preferably a dilute acidic rinse, such as sulfuric acid diluted in water, for example, having a pH of about 5. A dilute acidic rinse is preferred to prevent a drastic pH change after application of the second chemical solution 22. A reservoir 26 may be may be provided to catch the runoff rinsing agent, which may then be pumped back to the sprayer 28. As shown, the rinsing agent 24 is applied by spraying, though it could be applied by rolling or immersing the strip 102 in the rinsing agent 24. A final rinse, such as a water rinse (not shown), may then be used to remove any remaining soluble salts that may have formed on the surface of the metal strip.

Though FIG. 2 depicts application of two chemical solutions, it should be understood that any number of chemical solutions may be applied to the surface of the metal strip in order to achieve the desired potential drop. Combinations of chemical solutions applied in a test environment, and the corresponding potential drops achieved are provided in Table 1.

Examples

Principles of the invention were tested in accordance with the so-called "through-plane electrical conductivity" test.

This test provides a simple, fast, and accurate way to compare different bipolar plates, without the costs associated with building an actual fuel cell stack.

Testing was performed on a sample that was subjected to various pressures similar to those that would be applied in an actual fuel cell. FIG. 3 depicts a cross-section of such a test sample 60, which includes a layer of a diffusion medium 40, such as a carbon fiber felt paper, sandwiched between two generally flat, uncoated metal plates 50A, 50B. The metal plates were produced according to the inventive method described above. That is, the several plates were successively contacted by each of the one or more chemicals listed in the first column of the table, in the order given, for the times given, at the temperature given.

The samples were formed by sandwiching a layer of carbon felt paper between a pair of plates so manufactured. Samples of about six inches by 12 inches were used. The plates used were about 5 thick; the carbon felt paper was about 1 mm thick. A current density of 1 A/cm$^2$ was applied to the sample using a 3 cm×3 cm platen brought into contact with the metal plates. Voltage drop across the medium/plate interface 62 was measured, and is provided in the third column. Similarly, voltage drop across the plate/medium interface 64 was measured, and is provided in the fourth column. Total voltage drop for the sample 60 was measured, and is provided in the fifth column. Table 1 provides test data for each sample over a range of applied forces.

TABLE 1

| Sample | | Applied Pressure (psi) | Medium/ metal Interface (mV) | Metal/ medium Interface (mV) | Total Pot. Drop (mV) |
|---|---|---|---|---|---|
| 1) | 316 Stainless | 1500 | 70 | 630 | |
| | | 2300 | 520 | 500 | 1009 |
| | | 5000 | 382 | 389 | 764 |
| 2) | PC1200 5%, 15 sec @ 160° F. | 1500 | 334 | 481 | 807 |
| | | 2300 | 210 | 356 | 566 |
| | | 3000 | 107 | 216 | 325 |
| 3) | PC1200 5%, 20 sec @ 160° F. | 1500 | 227 | 232 | 454 |
| | | 2300 | 133 | 137 | 267 |
| | | 3000 | 92 | 92 | 185 |
| 4) | PC1200 5%, 10 sec @ 160° F. + Brush | 1500 | 60 | 295 | 354 |
| | | 2300 | 39 | 177 | 215 |
| | | 3000 | 28 | 122 | 149 |
| 5) | R123 3% with no HF, 10 sec @ 150° F. | 1500 | 8 | 11 | 22 |
| | | 2300 | 6 | 8 | 17.7 |
| | | 3000 | 5.6 | 7.3 | 13.4 |
| 6) | PC1200 5%, 10 sec, H$_2$O rinse, R123 3% with no HF, 10 sec @ 150° F. | 1500 | 6 | 6.1 | 13.7 |
| | | 2300 | 5 | 4.9 | 12.6 |
| | | 3000 | 4.8 | 4.5 | 10.1 |
| 7) | R123 3% with 284 ppm F$^-$, 10 sec @ 150° F. | 1500 | 4.7 | 4.8 | 11.2 |
| | | 2300 | 3.8 | 3.6 | 8 |
| | | 3000 | 3.7 | 3.4 | 7.6 |
| 8) | PC1200 5%, 10 sec, H$_2$O rinse, R123 3% with 284 F$^-$, 10 sec @ 150° F. | 1500 | 5 | 4.1 | 9 |
| | | 2300 | 4.2 | 3.4 | 7.8 |
| | | 3000 | 3.5 | 3.4 | 6.7 |

TABLE 1-continued

| Sample | | Applied Pressure (psi) | Medium/ metal Interface (mV) | Metal/ medium Interface (mV) | Total Pot. Drop (mV) |
|---|---|---|---|---|---|
| 9) | PC1200 5%, 10 sec H$_2$O rinse, R123 3% with 568 F$^-$, 10 sec @ 150° F. | 1500 | 4.3 | 6.4 | 12 |
| | | 2300 | 3.8 | 5.1 | 10 |
| | | 3000 | 3.6 | 5 | 9.4 |
| 10) | PC1200 5%, 10 sec H$_2$O rinse, R123 3% with 568 F$^-$, 10 sec @ 150° F. tested 20 min later | 1500 | 6.2 | 7.5 | 13 |
| | | 2300 | 4.3 | 8.2 | 13.6 |
| | | 3000 | 3 | 6.4 | 11 |

Sample 1: As a benchmark, a sample (sample 1) comprising a layer of carbon felt paper sandwiched between two plates of untreated 316 stainless steel was tested at 1500, 2300, and 5000 psi. The results showed that even at 2300 psi, the total potential drop across the sample exceeded 1 V.
Sample 2: In sample 2, the plates were treated with a 5% solution of PC 1200 for 15 seconds at 160° F.
Sample 3: In sample 3, the plates were treated with a 5% solution of PC 1200 for 20 seconds at 160° F.
Sample 4: In sample 4, the plates were treated with a 5% solution of PC 1200 for 10 seconds at 160° F., and then brushed (i.e., the plates were physically abraded). Note that, in each case, the potential drop across the sample is in the range of about 150 to about 800 mV.
Sample 5: In sample 5, the plates were treated with a 3% solution of Ridolene 123, with no HF, for 10 seconds at 150° F. Note that, in each case, the potential drop across the sample is in the range of about 13 to about 22 mV. Hence, treatment with a 3% solution of Ridolene 123, with no HF, for 10 seconds, at 150° F. provides metal that may be suitable for use in the fabrication of bipolar plates for a fuel cell application.
Sample 6: In sample 6, the plates were treated with a 5% solution of PC 1200 for 10 seconds, rinsed with warm water, and then treated with a 3% solution of Ridolene 123, with no HF, for 10 seconds, at 150° F. Note that, in each case, the potential drop across the sample is in the range of about 10 to about 14 mV. Hence, treatment with a 5% solution of PC 1200 for 10 seconds, followed by treatment with a 3% solution of Ridolene 123, with no HF, for 10 seconds, at 150° F. provides metal that may be suitable for use in the fabrication of bipolar plates for a fuel cell application.
Sample 7: In sample 7, the plates were treated with a 3% solution of Ridolene 123, with 284 ppm of fluoride, for 10 seconds, at 150° F. Note that, in each case, the potential drop across the sample is in the range of about 7 to about 11 mV. Hence, treatment with a 3% solution of Ridolene 123, with 284 ppm of fluoride, for 10 seconds, at 150° F. provides metal that may be suitable for use in the fabrication of bipolar plates for a fuel cell application.
Sample 8: In sample 8, the plates were treated with a 5% solution of PC 1200 for 10 seconds, rinsed with warm water, and then treated with a 3% solution of Ridolene 123, with 284 ppm of fluoride, for 10 seconds, at 150° F. Note that, in each case, the potential drop across the sample is in the range of about 6 to about 9 mV. Hence, treatment with a 5% solution of PC 1200 for 10 seconds, followed by treatment with a 3% solution of Ridolene 123, with 284 ppm of fluoride, for 10 seconds, at 150° F. provides metal that may be suitable for use in the fabrication of bipolar plates for a fuel cell application.
Sample 9: In sample 9, the plates were treated with a 5% solution of PC 1200 for 10 seconds, rinsed with warm water, and then treated with a 3% solution of Ridolene 123, with 568 ppm of fluoride, for 10 seconds, at 150° F. Note that, in each case, the potential drop across the sample is in the range of about 9 to about 12 mV. Hence, treatment with a 5% solution of PC 1200 for 10 seconds, followed by treatment with a 3% solution of Ridolene 123, with 568 ppm of fluoride, for 10 seconds, at 150° F. provides metal that may be suitable for use in the fabrication of bipolar plates for a fuel cell application.
Sample 10: In sample 10, the plates were treated with a 5% solution of PC 1200 for 10 seconds, rinsed with warm water, and then treated with a 3% solution of Ridolene 123, with 568 ppm of fluoride, for 10 seconds, at 150° F. The sample, after drying, was let to sit in air for about 20 minutes before the test was performed. Note that, in each case, the potential drop across the sample is in the range of about 11 to about 14 mV. Hence, treatment with a 5% solution of PC 1200 for 10 seconds, followed by treatment with a 3% solution of Ridolene 123, with 568 ppm of fluoride, for 10 seconds, at 150° F. provides metal that may be suitable for use in the fabrication of bipolar plates for a fuel cell application, even after sitting in air for 20 minutes.

Thus, the test results provided in Table 1 show that a coil coating process may be used to fabricate a metal plate having a sufficiently low potential drop across it such that the plate that may be suitable for use as a bipolar plate in a fuel cell. Such a process may be performed in just a few seconds, as compared with the 45 minutes or so required by conventional electrochemical activation techniques.

It should be understood that the test data provided above demonstrates that the methods of the invention are viable for producing metal suitable for use in fuel cell applications. In application, the method parameters (e.g., the types of chemical solutions and rinses applied, application times, temperature, the order in which the solutions are applied, chemical concentrations, and the like) are expected to vary according to the type of metal used and the desired limits on potential drop. Those skilled in the art will appreciate that only routine experimentation is likely to be required in order to determine optimal values for these parameters for a given application.

Further, it should be understood that, although the tests described above were performed on samples comprising plates of 316 stainless steel, other stainless steels, and other metals such as titanium, aluminum, and their alloys, may also be treated according to the inventive methods in order to provide materials suitable for use in fabricating bipolar plates for fuel cell applications. It should also be understood that such methods may be used to provide metals that may be used in other applications unrelated to fuel cells.

To fabricate a bipolar plate from a coated metal strip made in accordance with the methods of the invention, a contoured piece may be stamped out of the coated metal strip. Two such contoured pieces may be put together to form a bipolar plate having an interior region for containing a cooling fluid and an exterior for contact with the diffusion media. To fabricate a fuel cell stack, a plurality of such plates may be stacked alternatively with diffusion media and then placed under pressure to seal the interfaces.

It should be understood that the foregoing illustrative embodiments have been provided merely for the purpose of explanation and are in no way to be construed as limiting of the invention. Words that have been used herein are words of description and illustration, rather than words of limitation. Further, although the invention has been described herein with reference to particular structure, materials, and/or embodiments, the invention is not intended to be limited to the particulars disclosed herein. Rather, the invention extends to all functionally equivalent structures, methods, and uses that are within the scope of the appended claims. Those skilled in the art, having the benefit of the teachings of this specification, may effect numerous modifications thereto, and changes may be made without departing from the scope and spirit of the invention.

What is claimed:

1. A method for deoxidizing a surface of a metal strip for use in a bipolar plate comprising:
   preselecting a potential drop value across a thickness of a metal strip;
   contacting the surface of the metal strip with a phosphate solution for a first preselected period of time, the phosphate solution having a pH between 10 and 14; and
   contacting the surface of the metal strip with an acid solution that consists essentially of acid and optionally surfactant and/or a fluoride source, for a second preselected period of time, the acid solution having a pH between 1 and 3, thereby deoxidizing the surface to produce deoxidized metal such that, after contacting the surface of the strip with the solutions, a measured potential drop across a thickness of the strip is less than the preselected potential drop value,
   wherein the preselected potential drop value is 8.2 mV at a current density of 1 ampere per square centimeter such that the metal strip is suitable for fabrication of bipolar plates.

2. The method of claim 1 further comprising applying a conductive organic coating to the surface of the strip subsequent to contacting the surface of the strip with the solutions.

3. The method of claim 2 further comprising rinsing the surface of the metal strip with a dilute acidic rinse after causing the acid solution to contact the surface of the metal strip and before applying the organic coating.

4. The method of claim 3 further comprising rinsing the surface of the metal strip with water after rinsing the surface of the metal strip with the dilute acidic rinse and before applying the organic coating.

5. The method of claim 1 wherein contact with the phosphate solution precedes contact with the acid solution.

6. The method of claim 1 wherein the contacting steps are separated by rinsing the surface with an aqueous rinsing agent.

7. The method of claim 1 wherein the metal strip is uncoiled prior to contact with either of the solutions.

8. The method of claim 7 further comprising coiling the strip subsequent to contact with the solutions.

9. The method of claim 1, wherein the acid solution includes fluoride.

10. The method of claim 1, wherein the acid solution includes a surfactant.

11. The method of claim 1, wherein the phosphate solution includes an organic chelant.

12. A method for deoxidizing a surface of a metal strip for use in a bipolar plate comprising:
    contacting the surface with a first chemical solution that is alkaline and comprises a phosphate source and an organic chelant for a first preselected period of time;
    rinsing the surface with water; and
    contacting the surface with a second chemical solution that is acidic and consists essentially of sulfuric acid and surfactants, for a second preselected period of time, thereby deoxidizing the surface to produce deoxidized metal such that, after contacting the surface of the strip with the solutions, a potential drop across a thickness of the strip is less than 15 mV at a current density of 1 ampere per square centimeter;
    selecting the first and second preselected periods of time such that, after contacting the surface of the strip with the solutions, a potential drop across a thickness of a treated strip is less than a preselected value that is useful in fabricating bipolar plates;
    wherein the treated strip is used in fabricating a bipolar plate.

13. The method of claim 12 wherein the contacting is with at least two chemical solutions;
    the first chemical solution having a pH between 10 and 14; and
    the second chemical solution having a pH between 1 and 3.

14. The method of claim 12 wherein the contacting is with at least two chemical solutions; each of said solutions having preselected pH and temperature and being in contact with the surface for preselected periods of time.

15. The method of claim 12 further comprising coating at least a portion of the treated surface with a conductive organic coating.

16. The method of claim 12 wherein contacting comprises immersing the surface in each of the chemical solutions.

17. The method of claim 12 wherein contacting comprises spraying the surface with each of the chemical solutions.

18. The method of claim 12, wherein the potential drop is less than 15 mV at a current density of 1 ampere per square centimeter.

19. The method of claim 12, wherein the surface is contacted at least one of the chemical solutions in a coil coating process.

20. The method of claim 12 wherein the second chemical solution further comprises fluorine.

21. The method of claim 12 wherein the surface comprises stainless steel, aluminum and/or titanium and the first preselected period of time is about 10-20 seconds and the second preselected period of time is about 10 sec.

22. A method for deoxidizing a surface of a metal strip for use in a bipolar plate comprising:
    contacting the surface with a phosphate solution for a first preselected period of time, the phosphate solution having a pH between 10 and 14;

rinsing the surface with water; and contacting the surface with an acid solution for a second preselected period of time, the acid solution having a pH between 1 and 3, thereby deoxidizing the surface to produce deoxidized metal selecting the first and second preselected periods of time such that, after contacting the surface of the strip with the solutions, a potential drop across a thickness of the strip is less than a preselected value useful in fabricating bipolar plates; and applying a conductive organic coating to the surface of the strip; wherein the strip is used in fabricating bipolar plates.

23. A method of fabricating a bipolar plate from a metal strip comprising:

cleaning a metal surface of a metal strip in a coil coating process, said metal surface comprising stainless steel, aluminum and/or titanium and having a native oxide layer thereon, by contacting with a phosphate solution for a first preselected period of time, the phosphate solution having a pH between 10 and 14; and reducing thickness of said native oxide layer by contacting said metal surface, in a coil coating process, with an acid solution, for a second preselected period of time, the acid solution having a pH between 1 and 3, selecting the first and second preselected periods of time such that, after contacting the surface of the strip with the solutions, a potential drop across a thickness of the strip is less than a preselected value;

optionally applying a conductive organic coating to the surface of the metal strip;

stamping one or more contoured pieces from said metal strip; and forming the bipolar plate by putting together two of said contoured pieces.

24. The method of claim 23 wherein the preselected value is 8.2 mV.

25. The method of claim 23 wherein the first preselected period of time is about 10-20 seconds and the second preselected period of time is about 10 sec.

26. The method of claim 23, wherein the acid solution includes fluoride.

27. The method of claim 23 wherein the conductive organic coating is applied to the surface of the strip subsequent to contacting the surface of the strip with the solutions.

28. The method of claim 27 further comprising rinsing the surface of the metal strip with a dilute acidic rinse after causing the acid solution to contact the surface of the metal strip and before applying the organic coating.

29. The method of claim 28 further comprising rinsing the surface of the metal strip with water after rinsing the surface of the metal strip with the dilute acidic rinse and before applying the organic coating.

30. The method of claim 23 wherein contact with the phosphate solution precedes contact with the acid solution.

31. The method of claim 23 wherein the contacting steps are separated by rinsing the surface with an aqueous rinsing agent.

32. The method of claim 23, wherein the acid solution includes a surfactant.

33. The method of claim 23, wherein the phosphate solution includes an organic chelant.

34. A method of fabricating a bipolar plate from a metal strip comprising:

cleaning a metal surface of a metal strip in a coil coating process, said metal surface comprising stainless steel, aluminum and/or titanium and having a native oxide layer thereon, by contacting with a phosphate solution for a first preselected period of time, the phosphate solution having a pH between 10 and 14; and reducing thickness of said native oxide layer by contacting said metal surface, in a coil coating process, with an acid solution, for a second preselected period of time, the acid solution having a pH between 1 and 3, selecting the first and second preselected periods of time such that, after contacting the surface of the strip with the solutions, a potential drop across a thickness of the strip is less than a preselected value resulting in a treated strip suitable for use in a bipolar plate;

wherein the treated strip is used in fabricating a bipolar plate.

35. The method of claim 34 wherein the first preselected period of time is about 10-20 seconds and the second preselected period of time is about 10 sec.

36. The method of claim 34, wherein the preselected value is 8.2 mV at a current density of 1 ampere per square centimeter.

37. The method of claim 34 wherein an organic coating is applied to the surface of the strip subsequent to contacting the surface of the strip with the solutions.

38. The method of claim 37 further comprising rinsing the surface of the metal strip with a dilute acidic rinse after causing the acid solution to contact the surface of the metal strip and before applying the organic coating.

39. The method of claim 38 further comprising rinsing the surface of the metal strip with water after rinsing the surface of the metal strip with the dilute acidic rinse and before applying the organic coating.

40. The method of claim 34 wherein contact with the phosphate solution precedes contact with the acid solution.

41. The method of claim 34 wherein the contacting steps are separated by rinsing the surface with an aqueous rinsing agent.

42. The method of claim 34, wherein the acid solution includes a surfactant.

43. The method of claim 34, wherein the phosphate solution includes an organic chelant.

* * * * *